United States Patent [19]

Chi

[11] Patent Number: 5,331,864
[45] Date of Patent: * Jul. 26, 1994

[54] BICYCLE HEADSET

[76] Inventor: Yi-Chen Chi, No. 139-5, An Mei Rd., Mei Shan Village, Hou Li Hsiang, Taichung Hsien, Taiwan

[*] Notice: The portion of the term of this patent subsequent to Apr. 13, 2010 has been disclaimed.

[21] Appl. No.: 962,528

[22] Filed: Oct. 16, 1992

[51] Int. Cl.⁵ .............................................. B62K 21/12
[52] U.S. Cl. ...................... 74/551.1; 280/273; 403/370; 403/131; 403/279; 384/537
[58] Field of Search ........................ 74/551.1–551.7; 384/537, 545, 512; 280/279; 403/24, 88, 370, 191, 279

[56] References Cited

U.S. PATENT DOCUMENTS

| | | | |
|---|---|---|---|
| 555,150 | 2/1896 | Dieterich et al. | 74/551.1 |
| 627,187 | 6/1899 | Hall | 74/551.1 |
| 2,500,909 | 3/1950 | Winby | 403/279 X |
| 3,304,099 | 2/1967 | Jankowski | 74/551.1 |
| 3,438,650 | 4/1969 | Cabeza | 280/279 |
| 3,902,816 | 9/1975 | Moore | 403/114 |
| 4,068,961 | 1/1978 | Ebner et al. | 403/55 |
| 4,274,301 | 6/1981 | Katayama | 74/551.1 |
| 4,323,263 | 4/1982 | Cook | 280/279 |
| 4,341,394 | 7/1982 | Cabeza | 280/279 |
| 4,410,197 | 10/1983 | St. Hillaire | 280/279 |
| 4,545,594 | 10/1985 | Cabeza | 280/279 |
| 4,545,691 | 10/1985 | Kastan et al. | 403/370 X |
| 4,653,768 | 3/1987 | Keys et al. | 74/551.1 X |
| 4,708,574 | 11/1987 | Conboy et al. | 414/591 |
| 4,722,502 | 2/1988 | Mueller et al. | 248/284 |
| 4,770,435 | 9/1988 | Cristie | 74/551.4 X |
| 4,890,947 | 1/1990 | Williams et al. | 403/16 |
| 4,915,535 | 4/1990 | Willetts | 403/191 |
| 5,080,519 | 1/1992 | Chi | 403/324 X |
| 5,085,063 | 2/1992 | Van Dyke et al. | 280/279 X |
| 5,095,770 | 3/1992 | Rader, III | 74/551.1 |
| 5,163,758 | 11/1992 | Chi | 384/540 |
| 5,178,035 | 1/1993 | D'Aluisio | 74/551.1 |
| 5,197,349 | 3/1993 | Herman | 74/551.1 |
| 5,201,242 | 4/1993 | Chi | 403/370 X |
| 5,201,244 | 4/1993 | Stewart et al. | 74/551.3 |

FOREIGN PATENT DOCUMENTS

| | | | |
|---|---|---|---|
| 160104 | 5/1983 | Fed. Rep. of Germany | 74/551.1 |
| 2379423 | 10/1978 | France | 74/551.1 |
| 2379316 | 3/1979 | France | 74/551.1 |

Primary Examiner—Vinh T. Luong
Attorney, Agent, or Firm—Woodcock Washburn Kurtz Mackiewicz & Norris

[57] ABSTRACT

A bicycle headset includes a head tube engaged on a steerer tube, a lower bowl engaged in an upper portion of the head tube, a bearing engaged on the lower bowl, a sleeve engaged on the steerer tube, an upper bowl engaged on the bearing and engaged on the sleeve. A ring extends through the sleeve and couples the upper bowl and the steerer tube together such that the upper bowl and the sleeve and the steerer tube rotate in concert. A tapered surface is formed in the sleeve and the upper bowl so that the sleeve is forced radially inward by the upper bowl.

11 Claims, 4 Drawing Sheets

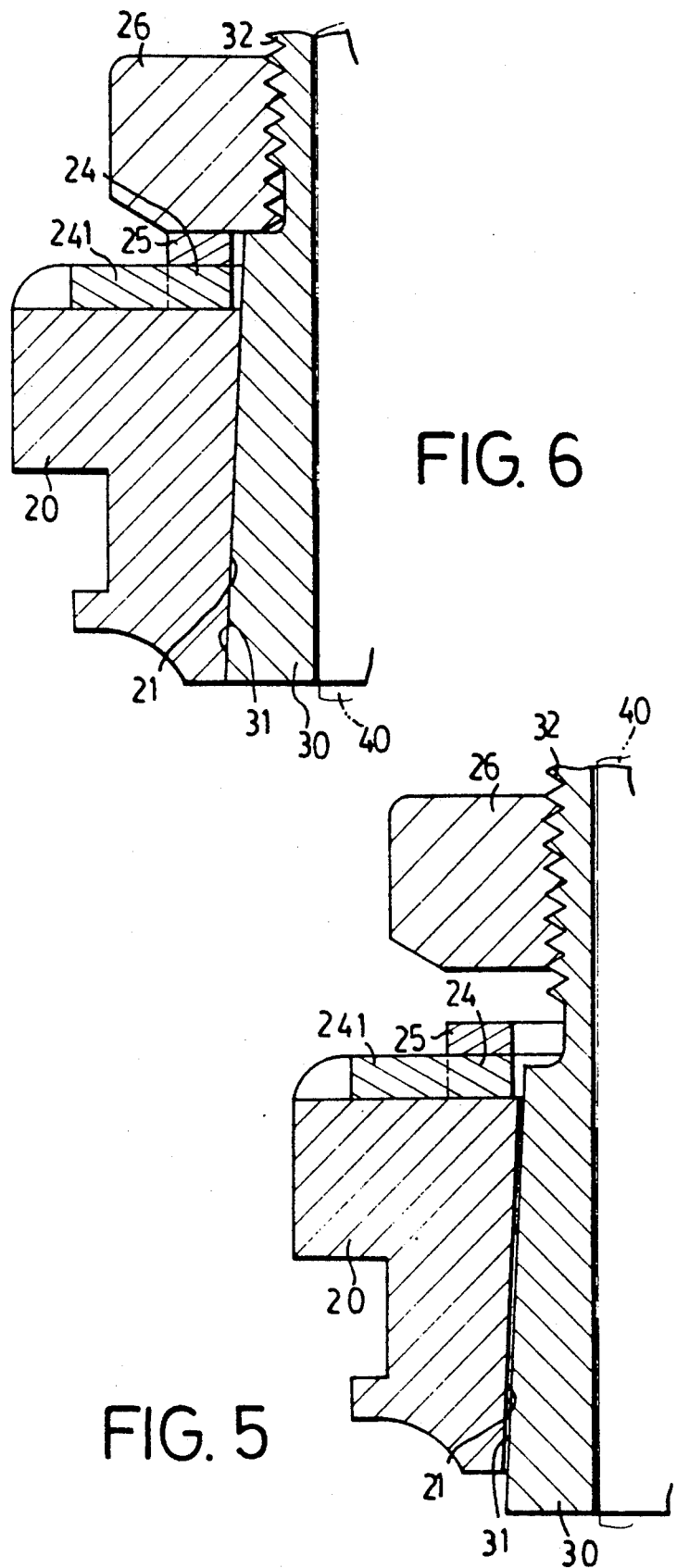

BICYCLE HEADSET

BACKGROUND OF THE INVENTION

1. Field of the Invention

The present invention relates to a headset, and more particularly to a headset for a wheeled vehicle, such as a bicycle.

2. Description of the Prior Art

A typical headset is disclosed in U.S. Pat. No. 4,274,301 to Katayama, filed Jun. 30, 1978, in this patent, the upper bearing assembly is fixed in place by a compression nut.

Another type of headset is disclosed in U.S. Pat. No. 5,095,770 to Rader, III, filed Sep. 28, 1990, in this patent, the compression ring is directly engaged between the steerer tube and the upper bearing assembly, the upper bearing assembly which is generally made weak will be forced radially outward by the compression ring and suffers a large load when the bicycle bumps along rough road, such that the bearing assembly is apt to be broken.

The present invention has arisen to mitigate and/or obviate the afore-described disadvantages of the conventional bicycle headsets.

SUMMARY OF THE INVENTION

The primary objective of the present invention is to provide a bicycle headset in which upper bearing can be stably and safely retained in place.

In accordance with one aspect of the invention, there is provided a headset for use in a wheeled vehicle comprising a steerer tube, a head tube engaged on the steerer tube, a lower bowl engaged in an upper portion of the head tube and engaged between the steerer tube and the head tube, a bearing rotatably engaged on the lower bowl, a sleeve engaged on the steerer tube and located above the lower bowl, an upper bowl engaged on the bearing and engaged on the sleeve, and means for coupling the upper bowl to the steerer tube, the coupling means being engaged on the sleeve and arranged such that the upper bowl and the sleeve and the steerer tube rotate in concert.

The steerer tube includes a slot formed therein, the sleeve includes a slit vertically formed therein, the upper bowl includes a notch formed therein, the coupling means includes a ring element having a key extended outward therefrom for engagement with the notch of the upper bowl and having an extension extended inward through the slit of the sleeve and engaged with the slot of the steerer tube, whereby, the upper bowl and the sleeve and the steerer tube are coupled together and rotated in concert. The ring element is wave shaped.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 5 and 6 are partial cross sectional views illustrating the operations of the bicycle headset.

DETAILED DESCRIPTION OF THE PREFERRED EMBODIMENT

Figure 2:
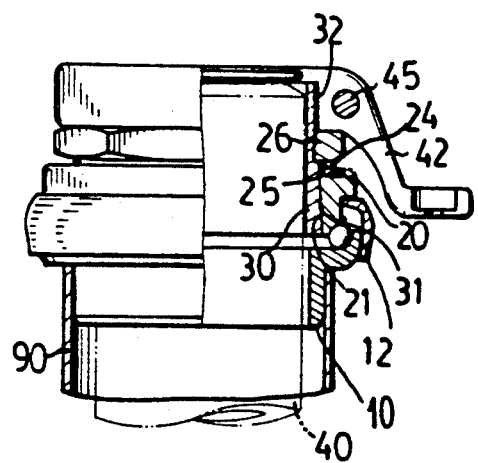
FIG. 2 is a cross sectional view taken along lines 2—2 of FIG. 1.
Figure 1:
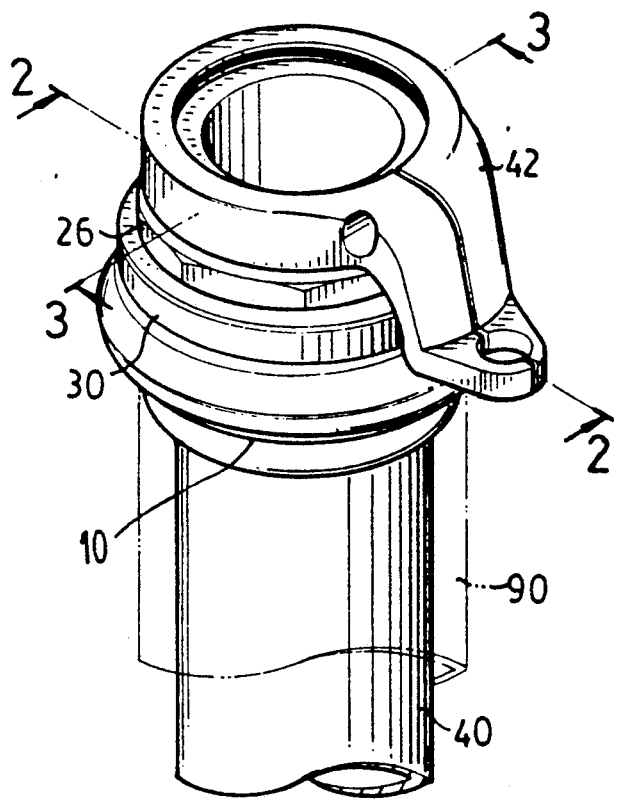
FIG. 1 is a perspective view of a bicycle headset in accordance with the present invention.

Referring to the drawings, and initially to FIGS. 1 to 4, a bicycle headset in accordance with the present invention comprises generally a head tube 90 engaged on a steerer tube 40 which is extended upward from the front fork of the bicycle and which includes a slot 41 longitudinally formed in the outer peripheral portion thereof, a lower bowl 10 engaged in the upper portion of the head tube 90 and engaged between the steerer tube 40 and the head tube 90, a bearing 11 rotatably received in the upper portion of the lower bowl 10, a sleeve 30 engaged on the steerer tube 40 and located above the lower bowl 10, the sleeve 30 including a tapered surface 31 formed in the lower portion of the outer peripheral portion thereof and including an outer thread 32 formed in the upper portion of the outer peripheral portion, the sleeve 30 further including a slit 34 vertically formed therein and extended along the length thereof.

An upper bowl 20 is rotatably engaged on the bearing 11 and includes a tapered surface 21 formed in the inner peripheral portion thereof for engagement with the tapered surface 31 of the sleeve 30 such that the upper bowl 20 may exert a downward and a radially inward force on the lower portion of the sleeve 30 and such that the sleeve will be compressed inwards to grasp the steerer tube 40. The upper bowl 20 includes an annular shoulder 22 formed in the upper and radially inward portion thereof and two notches 23 oppositely formed therein and communicated with the annular shoulder 22, the upper bowl 20 further includes an annular groove 28 formed in the outer peripheral portion thereof for engagement with a cap 12 which is provided to cover the bearing 11.

Figure 3:
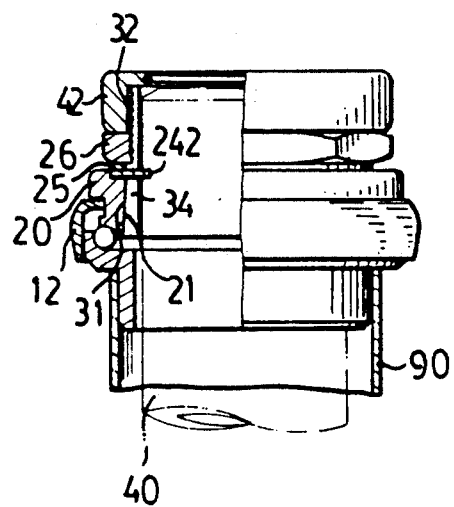
FIG. 3 is a cross sectional view taken along lines 3—3 of FIG. 1.
Figure 4:
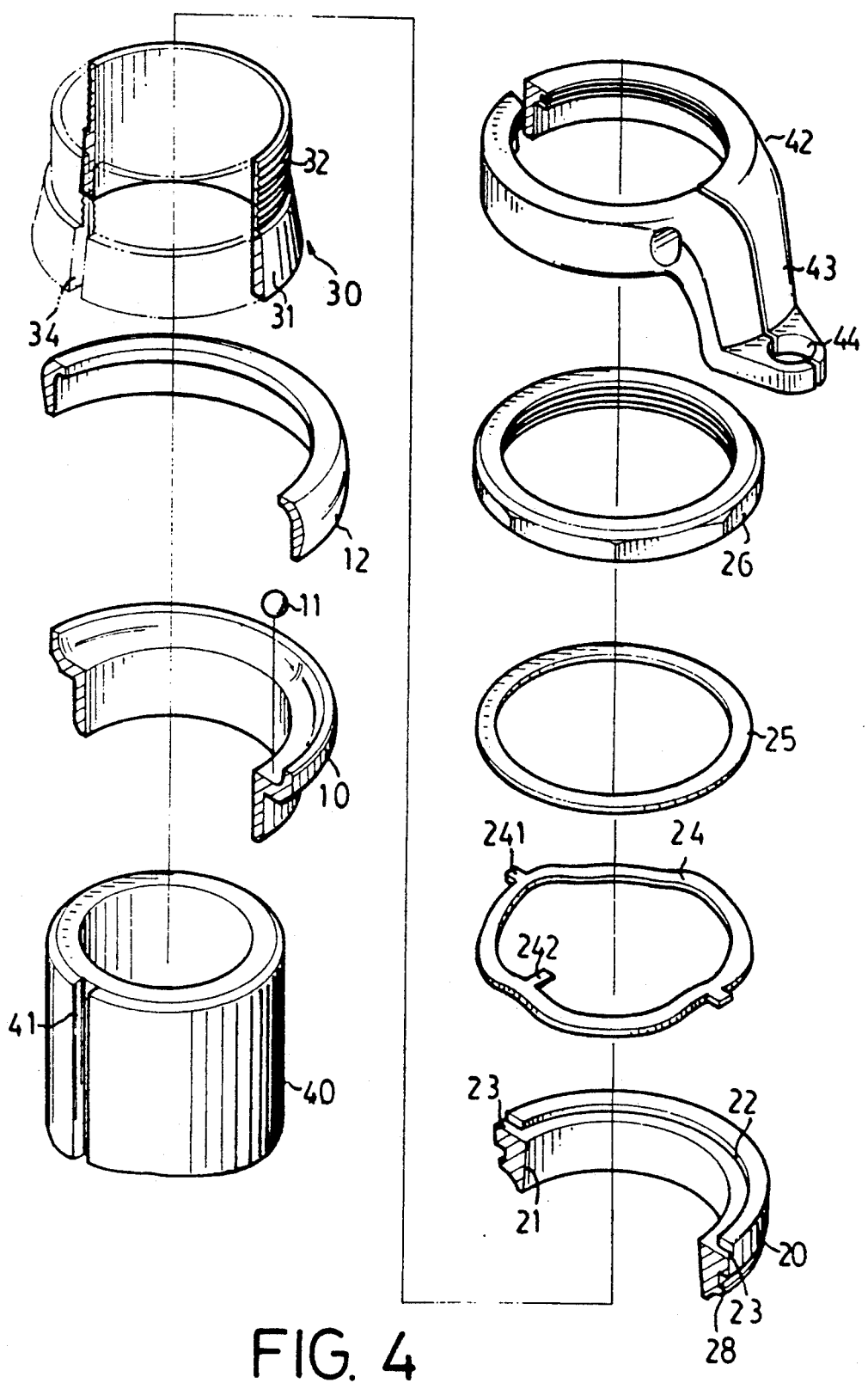
FIG. 4 is an exploded view of the bicycle headset.

A ring element 24 which is wave-shaped is engaged on the sleeve 30 and engaged in the annular shoulder 22 of the upper bowl 20 and includes two keys 241 oppositely extended outward therefrom for engagement with the notches 23 of the upper bowl 20 such that the ring element 24 and the upper bowl 20 rotated in concert, the ring element 24 further includes an extension 242 extended inward therefrom and extended through the slit 34 of the sleeve 30 in order to be engaged in the slot 41 of the steerer tube 40, such that the steerer tube 40 and the upper bowl 20 and the ring element 24 rotate in concert, best shown in FIG. 3. A washer 25 which is flat is engaged on the sleeve 30 and engaged above the ring element 24, a compression nut 26 is threadedly engaged with the outer thread 32 of the sleeve 30.

A guide 42 which is ring-shaped is engaged on the upper portion of the sleeve 30 and includes a pair of legs 43 extended in parallel, and an opening 44 formed in the free end portions of the legs 43 for guiding a cable element, such as the brake cable (not shown), the upper portions of the legs 43 are fixed together by a bolt 45 (FIG. 2).

Referring next to FIGS. 5 and 6, when the compression nut 26 is threaded into place, i.e., moved downward relative to the sleeve 30, the upper bowl 20 will then be caused to move downward such that the a downward and radially inward force is applied to the lower portion of the sleeve 30 by the engagement between the tapered surfaces 21 and 31 of the upper bowl 20 and the sleeve 30 respectively, whereby, the sleeve 30 can be stably coupled to the steerer tube 40, and the steerer tube 40 and the sleeve 30 and the upper bowl 20 can thus further be stably coupled together.

It is to be noted that the upper bowl 20 is different from the conventional upper bowl and includes a cap 12 engaged on the outer portion thereof, the cap 12 suffers almost no external force such that the cap 12 will not be easily broken, the upper bowl 20 is engaged on the sleeve 30 and applies a downward and radially inward force to the sleeve, such that the upper bowl 20 and the sleeve 30 and the steerer tube 40 can be stably coupled together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A headset for use in a wheeled vehicle comprising a steerer tube, a head tube engaged on said steerer tube by a lower bowl engaged in an upper portion of said head tube and engaged between said steerer tube and said head tube, a bearing rotatably engaged on said lower bowl, a sleeve engaged on said steerer tube and located above said lower bowl and including a slit vertically formed along the length thereof and a first tapered surface formed in an outer peripheral portion thereof, an upper bowl engaged on said bearing and including a second tapered surface formed in an inner peripheral portion thereof for engagement with said first tapered surface of said sleeve and arranged wherein said upper bowl applies a downward and radially inward force to said sleeve when said upper bowl moves downward toward said lower bowl, means for compressing said upper bowl downward toward said lower bowl, wherein, said sleeve is forced radially inward by said upper bowl in order to stably couple said upper bowl and said sleeve and said steerer tube together.

2. A headset according to claim 1, further comprising means for coupling said upper bowl to said steerer tube, said coupling means being engaged on said sleeve.

3. A headset according to claim 2, wherein said steerer tube includes a slot formed therein, said upper bowl includes at least one notch formed therein, said coupling means includes a ring element having at least one key extending outward therefrom for engagement with said notch of said upper bowl and having an extension extended inward therefrom and extended through said slit of said sleeve and engaged with said slot of said steerer tube.

4. A headset according to claim 3, wherein said ring element is wave shaped.

5. A headset for use in a wheeled vehicle comprising a steerer tube, a head tube engaged on said steerer tube by a lower bowl engaged in an upper portion of said head tube and engaged between said steerer tube and said head tube, a bearing rotatably engaged on said lower bowl, a sleeve engaged on said steerer tube and located above said lower bowl and including a slit vertically formed along the length thereof and a first tapered surface formed in an outer peripheral portion thereof, an upper bowl engaged on said bearing and including a second tapered surface formed in an inner peripheral portion thereof for engagement with said first tapered surface of said sleeve and arranged such that said upper bowl applies a downward and radially inward force to said sleeve when said upper bowl moves downward toward said lower bowl, means for compressing said upper bowl downward toward said lower bowl in order to force said sleeve radially inward so as to stably couple said upper bowl and said sleeve and said steerer tube together, and means for coupling said upper bowl to said steerer tube, said coupling means being engaged on said sleeve.

6. A headset according to claim 5, wherein said steerer tube includes a slot formed therein, said upper bowl includes at least one notch formed therein, said coupling means includes a ring element having at least one key extended outward therefrom for engagement with said notch of said upper bowl and having an extension extended inward therefrom and extended through said slit of said sleeve and engaged with said slot of said steerer tube.

7. A headset according to claim 6, wherein said ring element is wave shaped.

8. A headset for use in a wheeled vehicle comprising a steerer tube including a slot formed therein, a head tube mounted around said steerer tube by a lower bowl which is engaged in an upper portion of said head tube and which is engaged between said steerer tube and said head tube, a bearing rotatably engaged on said lower bowl, a sleeve including a slit vertically formed therein engaged on said steerer tube and located above said lower bowl, and an upper bowl including at least one notch formed therein engaged on said sleeve, a coupling means including a ring element having at least one key extending outward therefrom for engagement with said notch of said upper bowl and having an extension extending inward therefrom and extending through said slit of said sleeve and engaged with said slot or said steerer tube.

9. A headset according to claim 8, wherein said ring element is wave shaped.

10. A headset for use in a wheeled vehicle comprising a steerer tube, a head tube mounted around said steerer tube by a lower bowl which is engaged in an upper portion of said head tube and which is engaged between said steerer tube and said head tube, a bearing rotatably engaged on said lower bowl, a sleeve including a first tapered surface formed in an outer peripheral portion thereof engaged on said steerer tube and located above said lower bowl, an upper bowl including a second tapered surface formed in an inner peripheral portion thereof engaged on said bearing for engagement with said first tapered surface of said sleeve, and means for coupling said upper bowl to said steerer tube, said coupling means being engaged on said sleeve.

11. A headset for use in a wheeled vehicle comprising a steerer tube, a head tube engaged on said steerer tube by a lower bowl engaged in an upper portion of said head tube and engaged between said steerer tube and said head tube, a bearing rotatably engaged on said lower bowl, a sleeve engaged on said steerer tube and located above said lower bowl, an upper bowl engaged on said bearing and engaged on said sleeve, means for coupling said upper bowl to said steerer tube, said coupling means being engaged on said sleeve, a guide engaged on said steerer tube and including a pair of legs extending in parallel and extending outward therefrom, an opening formed in said legs, and said legs being coupled together.

* * * * *